US008930880B2

(12) United States Patent
Weatherhead

(10) Patent No.: US 8,930,880 B2
(45) Date of Patent: Jan. 6, 2015

(54) DEVELOPMENT OF FUNCTIONAL MODULES USING A MODULE BUS

(75) Inventor: Norman A. Weatherhead, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 468 days.

(21) Appl. No.: 12/893,727

(22) Filed: Sep. 29, 2010

(65) Prior Publication Data

US 2012/0079157 A1    Mar. 29, 2012

(51) Int. Cl.
*G06F 9/44* (2006.01)
*G05B 19/042* (2006.01)

(52) U.S. Cl.
CPC .. *G05B 19/0426* (2013.01); *G05B 2219/23261* (2013.01); *G05B 2219/25333* (2013.01)
USPC ............................. 717/100; 717/120; 717/126

(58) Field of Classification Search
None
See application file for complete search history.

(56) References Cited

U.S. PATENT DOCUMENTS

| | | | | |
|---|---|---|---|---|
| 7,197,742 | B2* | 3/2007 | Arita et al. | 717/120 |
| 7,676,279 | B2* | 3/2010 | Hood et al. | 700/17 |
| 7,725,200 | B2* | 5/2010 | Reed et al. | 700/30 |
| 7,844,618 | B2* | 11/2010 | Brodhun et al. | 707/760 |
| 7,908,580 | B2* | 3/2011 | Stubbs et al. | 717/100 |
| 8,028,272 | B2* | 9/2011 | Eldridge et al. | 717/110 |
| 8,255,875 | B2* | 8/2012 | Chouinard et al. | 717/124 |
| 8,413,115 | B1* | 4/2013 | Surprise et al. | 717/121 |
| 8,448,146 | B2* | 5/2013 | Pasala et al. | 717/126 |
| 2004/0205692 | A1* | 10/2004 | Robinson | 717/100 |
| 2004/0261060 | A1* | 12/2004 | Haselden et al. | 717/120 |
| 2007/0073850 | A1* | 3/2007 | Callaghan et al. | 709/220 |
| 2008/0082577 | A1* | 4/2008 | Hood et al. | 707/104.1 |
| 2008/0097626 | A1* | 4/2008 | Reed et al. | 700/30 |
| 2008/0189636 | A1* | 8/2008 | Hood et al. | 715/771 |
| 2009/0172631 | A1* | 7/2009 | Zunke et al. | 717/100 |
| 2009/0228862 | A1* | 9/2009 | Bertelrud et al. | 717/100 |
| 2010/0083232 | A1* | 4/2010 | Chouinard et al. | 717/124 |
| 2011/0119655 | A1* | 5/2011 | Matsuda | 717/126 |
| 2012/0174064 | A1* | 7/2012 | Polly et al. | 717/120 |

OTHER PUBLICATIONS

Rinard et al., "A classification system and analysis for aspect-oriented programs," 2004, Proceedings of the 12th ACM SIGSOFT twelfth international symposium on Foundations of software engineering, pp. 147-158.*
Kiczales et al., "Aspect-oriented programming and modular reasoning," 2005, Proceedings of the 27th international conference on Software engineering, pp. 49-58.*
Lemos et al., "Control and data flow structural testing criteria for aspect-oriented programs," 2007, Journal of Systems and Software, vol. 80, Issue 6, pp. 862-882.*

* cited by examiner

*Primary Examiner* — Thuy Dao
*Assistant Examiner* — Stephen Berman
(74) *Attorney, Agent, or Firm* — Amin, Turocy & Watson, LLP

(57) ABSTRACT

Systems and methods are provided that facilitate development of a module for use in a control application by assembling one or more predefined aspects onto a module bus. The module bus acts as a virtual backplane that allows module functionality in the form of predefined bus-compliant aspects to be selected and added to the bus, thereby yielding a module having a desired set of functions. When an aspect is added to the module bus, the bus integrates the aspects into the module automatically without the need to modify the module's core code to interface the aspects with the module. The module bus also establishes the necessary interdependencies between aspects representing cross-cutting concerns without requiring new code to be writing to link the aspects.

19 Claims, 11 Drawing Sheets

DEVELOPMENT OF FUNCTIONAL MODULES USING A MODULE BUS

TECHNICAL FIELD

The claimed subject matter relates generally to module-based control, and more particularly development of executable modules using a set of functional aspects connected to a module bus.

BACKGROUND

Programmable automation controllers (PACs) and their associated control programming are at the heart of modern industrial automation systems. These controllers interact with field devices on the plant floor to carry out controlled processes relating to such objectives as manufacture of a product, movement of material through a system, and other such processes. The controllers typically exchange data with the field devices using native hardwired I/O or via a plant network such as Ethernet, Data Highway Plus, Devicenet, or the like. The controller receives any combination of digital or analog signals from the field devices indicating a current state of the devices (e.g., temperature, position, part presence or absence, fluid level, etc.), and executes a control program that performs automated decision-making for the process based on the received signals. The controller then outputs appropriate digital and/or analog control signaling to the field devices in accordance with the decisions made by the control program. These outputs can include component actuation signals, temperature or position control signals, commands to a machining or material handling robot, and the like.

The control program executed by the controller can comprise any conceivable type of code used to process input signals read into the controller and to control output signals from the controller, including but not limited to ladder logic, sequential function charts, function block diagrams, structured text, and the like. To simplify program development and to mitigate repetitive coding of commonly used functionality, the control program often includes or interacts with one or more functional modules, which are modular portions of code having predefined interfaces and functionality. These modules can interface with the control program through predefined inputs and outputs and perform data processing in accordance with one or more functions coded into the module. A module can represent a common control process or piece of equipment (e.g., a sequencing module, a motor control module, a material transfer module, a PID module, etc.), and can be deployed in any suitable controller to facilitate control processing per the module's designed functionality. Inputs, outputs, parameters, modes, statuses, and behaviors can be predefined for each module in accordance with its desired functionality.

Modules often comprise a number of cross-cutting concerns, or aspects, which are distinct features whose functionality affects several other parts of the module. Because of the programmatic interdependencies between aspects comprising a module, aspects typically cannot be added or modified without writing customized code establishing the interactions between the new or modified aspects and other portions of the module. For a new module, the interactions between the aspects must be defined during development. When modifying an existing module to add or modify aspects in accordance with the needs of a particular application, new code must be written to properly integrate the new or modified aspects with the preexisting aspects comprising the module. Thus, although a given aspect represents a definable area of functionality, the aspect cannot be added, removed, or modified in a clean, modular fashion.

Although modules are often designed to be used flexibly in a wide range of control applications, it is sometimes necessary to design a module tailored to the needs of a particular application. This sometimes involves programming a module from the ground up to meet the requirements of the application. In other instances, it may be preferable to modify or replace a selected subset of an existing module's functionality or aspects to suit the needs of a given system.

Because of the programmatic interdependencies between the aspects that make up a module, it is usually necessary write new custom code establishing the interactions between the new or altered aspects and other aspects comprising the module. In order to simplify module development, developers sometimes rely on reusable functional components that can be integrated into any given module. However, given the structural idiosyncrasies inherent in modules that were designed and written under different circumstances and to different specifications, as well as the interdependent nature of the cross-cutting concerns described above, even these reusable components require custom code to be written in order to properly adapt the components for operation within a particular module and to link the aspects within the module. Consequently, development or alteration of modules entails considerable investment of time and effort, even when needed functionality is readily available as a reusable component.

In view of the design inefficiencies discussed above, there is a need for an aspect-based module development architecture that allows functions compliant with the architecture to be easily and quickly combined to create a customized module without the need to write new code integrating the functions.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to a module development architecture that allows aspects developed in compliance with the architecture to be linked together without the need to write custom integration code to yield a customized module. The architecture comprises a generic module bus having associated logic for integrating selected aspects into the module. Aspects representing commonly used module functions can be developed to be compatible with the module bus, and the logic associated with the module bus ensures proper interaction between the aspects. In this way, architecture-compliant aspects can be readily added to the module bus without writing additional code to integrate the aspects, thereby creating a module ready for deployment in a control application. Using this architecture, a new aspect can be added to an existing module, and the module bus ensures that the new aspect integrates correctly with the other aspects connected to the bus. Aspects can also be removed from the module bus or replaced with new aspects without otherwise affecting operation of the module. A predefined module aspect can also be modified to suit the needs of a particular application without the need to rewrite the aspect's interface to the module bus or to write new code to integrate the modified aspect with a module.

According to another aspect, a library of predefined and pre-tested module aspects compatible with the module bus can be maintained. By virtue of the aspects' compatibility with the module bus interface, any combination of aspects can be selected from the library as needed and added to a module bus to create a new module.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
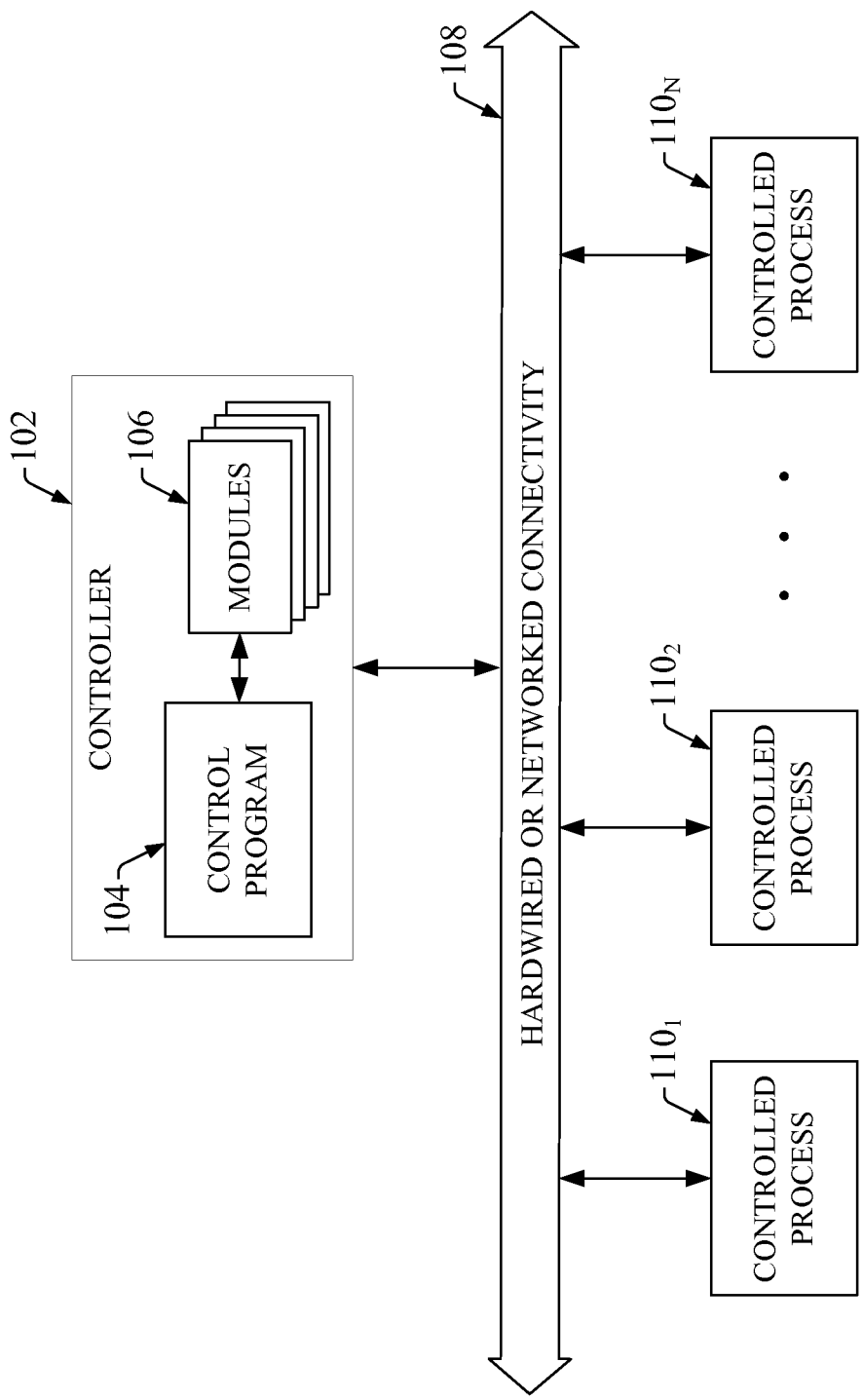
FIG. 1 depicts an exemplary control environment in which the modules of the present invention can be used.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is noted that as used in this application, terms such as "component," "module," "model, " and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

FIG. 1 illustrates an exemplary control environment in which the modules of the present invention can be used. An industrial facility can comprise one or more controlled processes $110_1$-$110_N$ designed to manufacture a product, perform material handling, or other industrial functions. Controlled processes $110_1$-$110_N$ can be monitored and controlled by at least one controller 102. Controller 102 can comprise an industrial controller, such as a programmable automation controller (PAC), that executes a control program 104 to facilitate monitoring and control of controlled processes $110_1$-$110_N$. Control program 104 can comprise any conceivable type of code used to process input signals read into the controller and to control output signals from the controller, including but not limited to ladder logic, sequential function charts, function block diagrams, or structured text. Data read into or generated by controller 102 can be stored in memory addresses within controller memory, which can comprise native memory or removable storage media.

Controller 102 can communicatively interface with controlled processes $110_1$-$110_N$ over hardwired or networked connections 108. For example, controller 102 can be equipped with native hardwired inputs and outputs that communicate with one or more field devices associated with the controlled processes $110_1$-$110_N$ to effect control of the devices. The native controller I/O can include digital I/O that transmits and receives discrete voltage signals to and from the field devices, or analog I/O that transmits and receives analog voltage or current signals to and from the devices. The controller I/O can communicate with the controller's processor over a backplane such that the digital and analog signals can be read into and controlled by the control programs. Controller 102 can also communicate with field devices over a network using, for example, a communication module or an integrated networking port. Exemplary networks can include the Internet, Intranets, Ethernet, DeviceNet, ControlNet, Data Highway and Data Highway Plus (DH/DH+), Remote I/O, Fieldbus, Modbus, Profibus, wireless networks, serial protocols, and the like. It is to be appreciated that controller 102 is not limited to the above specifications, and can include virtually any type of controller used to control an industrial process.

Controller 102 can also execute one or more functional modules 106 that interact with or comprise at least a portion of control program 104. Modules 106 are preconfigured blocks of code designed to carry out defined control functionality within controller 102. The modules can comprise predefined interfaces that allow control program 104 to interact with the modules. That is, data generated by control modules 106 is made available to control program 104 via predefined outputs associated with the modules 106, while predefined inputs associated with the modules 106 provide a means for control program 104 to write data to the modules 106. Modules 106 can also comprise predefined configuration parameters, operational modes, permissives, and other features commensurate with the programmed functionality of the respective module(s). The modules 106 process inputs in accordance with the modules' designated control functionality and generate outputs based on the processing. Each module 106 can represent, for example, a commonly utilized control function that has been coded into the module for reuse in multiple control applications. Modules 106 can also include modules that have been customized for use within a particular application. These customized modules can comprise modules that have been written in accordance with a customer's specifications, or modified versions of commonly available modules that have been tailored to meet the needs of a particular application. Modules 106 can execute autonomously or in conjunction with control program 104 to effect control of at least a portion of the controlled processes $110_1$-$110_N$.

Figure 2:
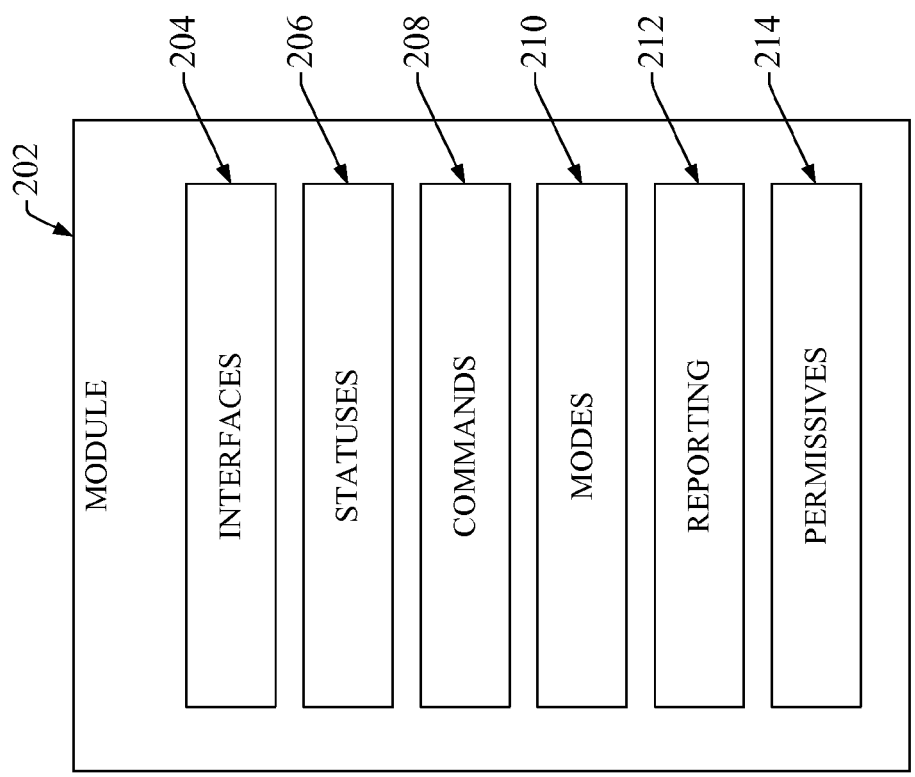
FIG. 2 depicts exemplary module characteristics.

FIG. 2 illustrates exemplary characteristics that can be programmed into a module. These characteristics are not intended to be exhaustive, and it is to be appreciated that a module can include any combination of suitable properties designed to meet the needs of a particular control application. As noted above, modules can comprise defined inputs and outputs, or interfaces 204. These interfaces allow data representing specified quantities or processes state to be provided to the module through designated binary or analog module inputs. Also, data generated by the module is made available through suitably designated outputs defined for the module. Module 202 can also include one or more defined statuses 206, which indicate a state of a device or process associated with the module. For example, if module 202 implements control functionality associated with a motor drive, the module can include defined "running" or "stopped" statuses that indicate the present state of the drive. Module 202 can be designed to generate one or more commands 208 under specified conditions. Commands 208 can include instructions to one or more field devices associated with the module, as well as instructions to other functional modules or portions of the control program. Module 202 can be configured to generate commands 208 in accordance with one or more control functions encoded in the module and in response to specified conditions indicated by input data provided to the module via interfaces 204.

Module 202 can also be designed to operate according to one or more operating modes 210. Thus, the statuses 206 and commands 208 generated by module 202 can be a function not only of the data provided to the module via interfaces 204, but also of the particular mode 210 in which the module is executing. If module 202 represents a field device, mode 210 can represent a current operating mode of the device itself (e.g., auto mode, semi-auto mode, stepping mode, etc.), and the control functionality implemented by the device can operate in accordance with this mode Likewise, if module 202 controls a step sequence that indexes a workpiece through a machining process, mode 210 can reflect the particular workpiece-specific sequencing mode being run. Also, one or more sets of permissives 214 can be programmed into module 202. Permissives 214 define conditions that must be met before a given process, process step, or other control action can be performed.

It is to be understood that the module characteristics described in connection with FIG. 2 can be defined by the aspects comprising the module. For example, a first aspect corresponding to a commonly used area of functionality can define a first set of interfaces, statuses, commands, etc. for the module. A second aspect representing a second distinct function can define a second set of interfaces, statuses, commands, etc. Depending on the functionality defined by the respective aspects and the interdependencies between the aspects, a composite set of characteristics will be defined for the module. Behavior of the various interfaces, statuses, commands, and other characteristics will be a function of the aspects that make up the module.

Figure 3:
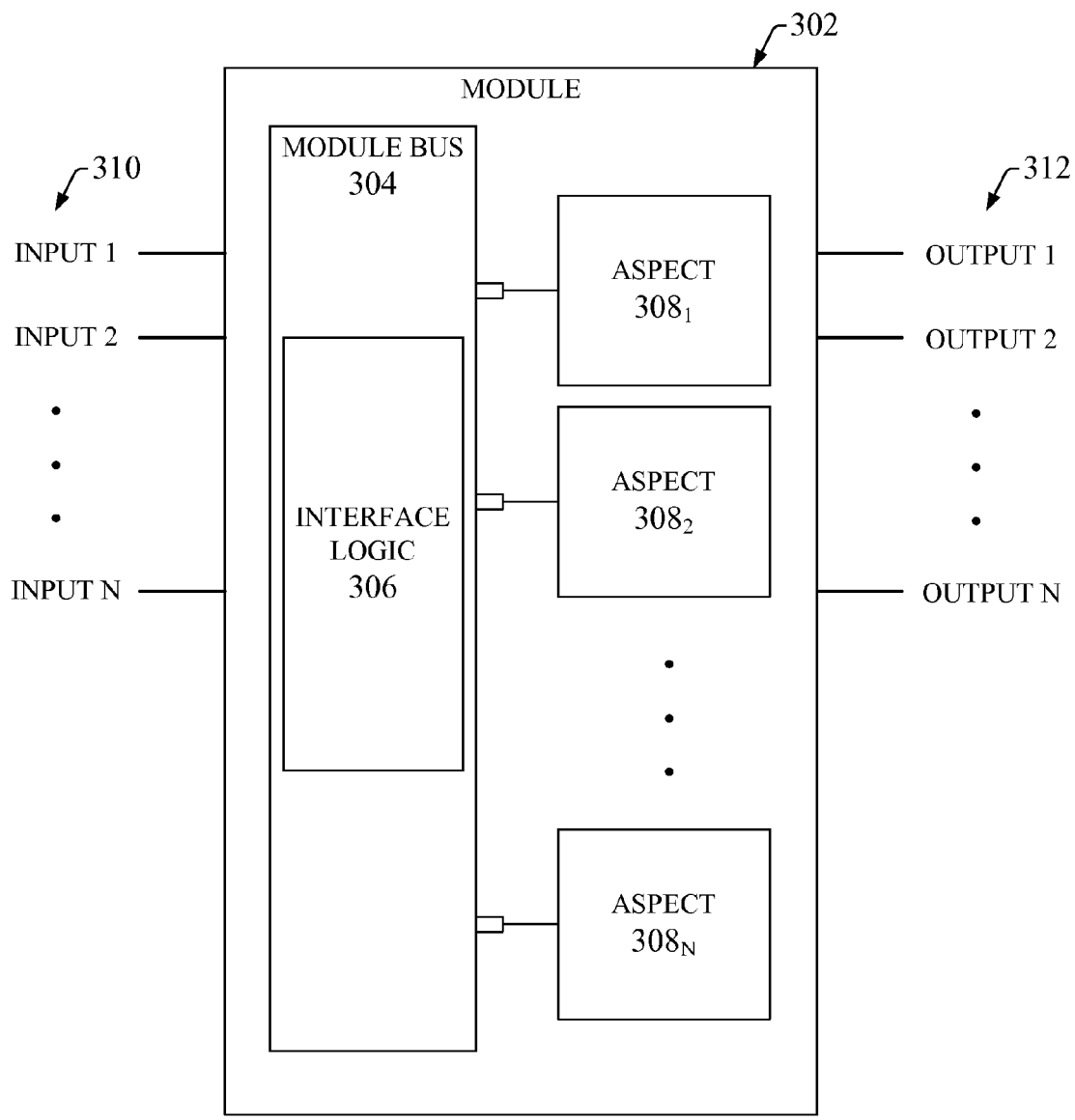
FIG. 3 depicts the structure of an exemplary module developed in accordance with the module bus architecture.

FIG. 3 illustrates the structure of an exemplary module 302 according to one or more embodiments of the present disclosure. In accordance with the architecture disclosed herein, module 302 comprises a module bus 304 and a set of aspects $308_1$-$308_N$. Module inputs 310 and outputs 312 are a function of the particular aspects $308_1$-$308_N$ comprising the module. Module bus 304 provides an infrastructure for linking aspects that have been developed in compliance with the bus. To this end, module bus 304 can include interface logic 306 that manages the interactions between the aspects $308_1$-$308_N$ connected to the bus 304. Thus, by virtue of their compatibility with module bus 304, aspects $308_1$-$308_N$ can be added to or removed from the module bus 304 without the need to write customized programming defining the interactions between the aspects or integrating the aspects with the module. In this sense, module bus 304 acts as a virtual backplane to which any number of selected aspects can be added to yield a customized module. Module bus 304 also allows aspects to be removed from the module bus 304 or replaced without otherwise affecting operation of the other aspects comprising the module, since module bus 304 and its associated interface logic 306 compensate for the deleted or replaced aspect and manage the interactions of the remaining aspects accordingly.

Using module bus 304 as a foundation, customized modules can be developed quickly and easily by selecting bus-compliant aspects representing desired functionality and connecting the aspects to the bus 304. Even though aspects $308_1$-$308_N$ can comprise cross-cutting concerns having functional interdependencies between one another, module bus 304 and its associated interface logic 306 can manage these interdependencies and remove the burden of writing custom code to integrate the aspects. Moreover, aspects can be swapped in and out of an existing module without rewriting code that manages the functional interactions between the aspects, since the new interactions are established automatically by module bus 304.

Figure 4:
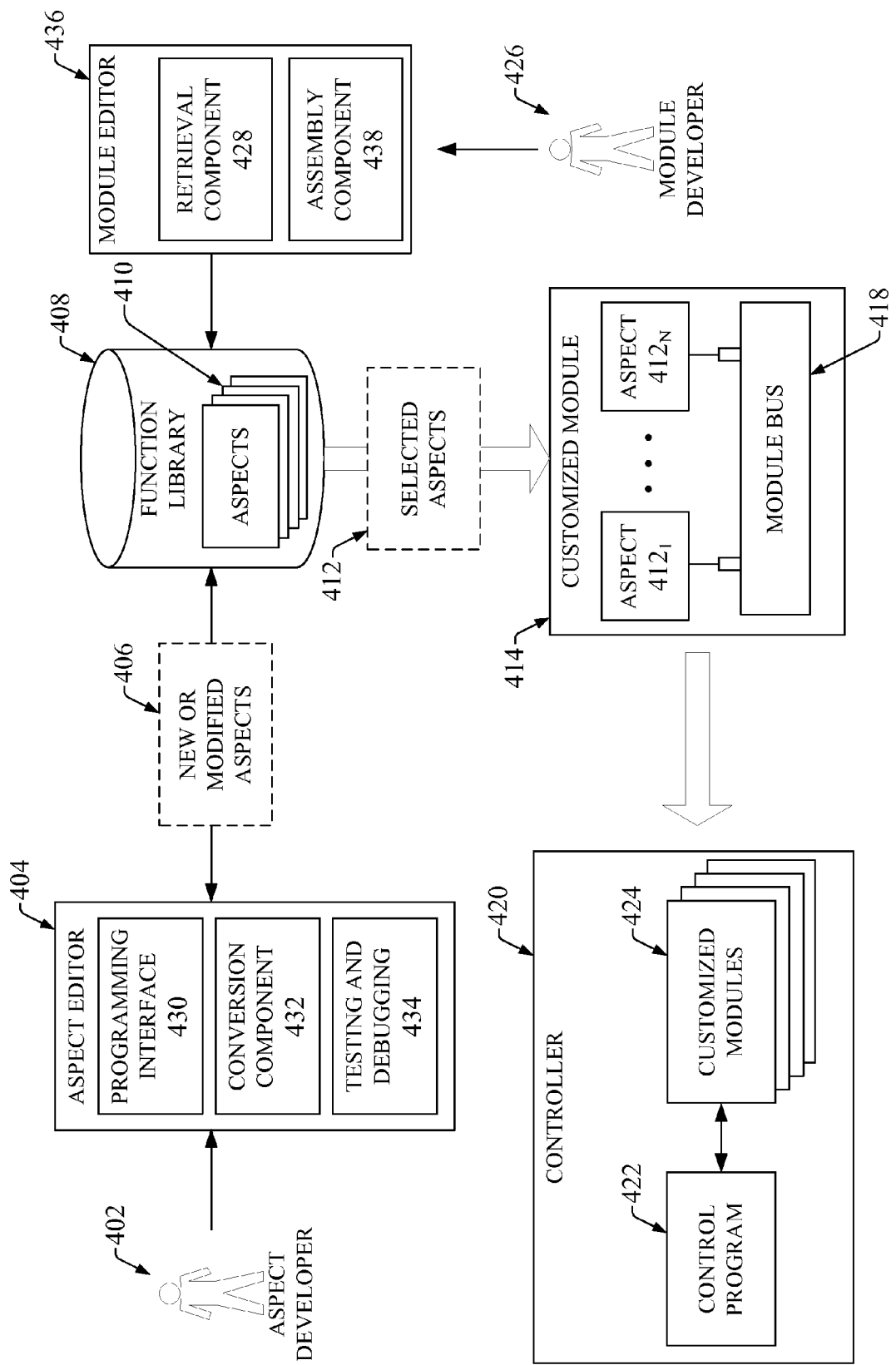
FIG. 4 depicts a system for developing, storing, and utilizing bus-compliant aspects to create customized modules.

FIG. 4 illustrates a system for developing, storing, and utilizing bus-compliant aspects to create customized modules for use in diverse control applications. An aspect developer 402 can employ an aspect editor 404 to create or modify aspects 406 that are compliant with the module bus architecture described herein. Aspects 406 can represent distinct functionality that can be added to a module together with other aspect-based functions. Aspects 406 can encapsulate functionality that is commonly used in various control applications and is therefore intended for use in a number of different modules. Aspects 406 can also be developed to meet a functional requirement unique to a particular control system. Aspect editor 404 can include a programming interface 430 through which developer 402 interacts with the aspect editor to program, test, and debug new aspects. Aspect editor 404 can support one or more suitable programming languages for developing module aspects, including but not limited to ladder code, function chart, script, JAVA, C code, Visual Basic, and the like. Additionally or alternatively, aspect editor 404 can support a proprietary programming platform for development of module aspects.

Since aspects developed by the aspect editor 404 must be compatible with the module bus, aspect editor 404 can include development tools that ensure compliance with the module bus architecture. These tools can include a conversion component 432 that receives a developer's functional specifications and converts the specifications into a bus-compliant aspect that can be readily added to a module bus. The development tools can also include development parameters that are inherent to the aspect editor's programming interface 430 and that guide the developer 402 through the process of creating a functional aspect that is compatible with the module bus. These development tools allow aspect developer 402 to create aspects that are compliant with the module bus architecture without requiring knowledge of the module bus compatibility specifications. Thus, aspect developer 402 can focus on coding the desired aspect functionality without the burden of hand-coding a compliant interface to the module bus, and conversion component 432 or other development tools associated with aspect editor 404 can ensure the aspect's compatibility with the module bus architecture.

Aspect editor 404 can include testing and debugging tools 434 that allow aspect developer 402 to verify operation of each aspect. These testing and debugging tools 434 can include, for example, simulation tools that test the outputs generated by an aspect under simulation in response to simulated inputs reflective of the aspect's expected control application. Aspect developer 402 can confirm proper operation of the aspect based on the aspect's response to the simulated inputs. Once an aspect has been developed, verified, and made compliant with the module bus architecture, the aspect can be added to substantially any module constructed using the module bus architecture (together with any desired combination of other aspects) without the need to retest the aspect or to write additional code integrating the aspect with other parts of the module, even though the aspect may comprise a cross-cutting concern that affects multiple parts of the module or other aspects within the module.

Aspects developed by the function editor 404 can be stored in a function library 408. Function library 408 can comprise any suitable data storage means capable of persisting blocks of code in a manner that allows the blocks of code to be searched and individually retrieved. Function library 408 can store a plurality of predefined aspects 410 for subsequent selection and retrieval by a module developer 426. In one or more embodiments, function library can reside on a web-enabled server, and aspects 410 can be uploaded to the server for subsequent searching and retrieval over the Internet. Alternatively, function library 408 and its contents can be maintained locally at a facility for exclusive local access by on-site module developers.

To facilitate browsing and searching, aspects 410 can be organized within function library according to any suitable classification structure. For example, aspects 410 can be categorized according to the particular industry to which the respective aspects are applicable (e.g., automotive, pharmaceutical, plastics, etc.). Additionally or alternatively, aspects 410 can be categorized according to the type of module or control application in which the aspects are intended to be used (e.g., motion applications, fluid control applications, energy control applications, etc.). In one or more embodiments, function library 408 can support a hierarchical storage architecture comprising multiple categories and sub-categories, and each aspect 410 can be classified within this hierarchical architecture. In such embodiments, this hierarchical storage architecture can be browsed to facilitate location of an aspect suitable to meet a given design requirement. To ensure proper classification of an aspect within the hierarchy, aspect editor 404 can include the capability to tag an aspect with a selected category and/or sub-category. Function library 408 can then classify the aspect within the hierarchy based on this tag information.

With a library of bus-compliant aspects 410 established, a module developer 426 can access this library to select and retrieve desired aspects to be included in a module. Modules can be developed, for example, using a module editor 436. Module editor 436 can comprise any suitable editing platform having means for associating a bus-compliant aspect with a module bus. Module editor 436 can be communicatively coupled to function library 408 to facilitate selection and retrieval of a desired aspect. For example, if function library 408 resides on a remote server having web connectivity, module editor can access function library 408 over an Internet connection. Alternatively, function library 408 can reside locally at the module developer's facility, and module editor 436 can access the library over a local area network or wireless local network. In some embodiments, the function library 408 can reside on the same machine as the module editor 436.

Aspects 410 can be browsed and selected by the module developer 426 using a retrieval component 428 included in module editor 436. Retrieval component 428 acts as an interface between the module developer 426 and function library 408, allowing module developer 426 to browse or search aspects 410 according to their respective functionalities. For example, if module developer 426 is designing a module for use in a motor control application and requires a particular speed control function, the developer 426 can instruct retrieval component 428 to search the predefined aspects 410 stored in function library 408 for an aspect encapsulating this function. Retrieval component 428 can also facilitate browsing of aspects 410 to locate the desired functionality. Thus, function library 408 and retrieval component 428 provide a means for selecting a desired combination of functional aspects 412 to satisfy a given set of module specifications.

Once the desired aspects 412 have been selected and retrieved from function library 408, an assembly component 438 of the module editor 436 can assemble the selected aspects 412 into a new customized module 414 by associating the individual aspects $412_1$-$412_N$ with a module bus 418. Module bus 418 acts as a virtual backplane that can accept one or more aspects $412_1$-$412_N$ to yield a customized module 414 that can be deployed in a control application to carry out defined control functionality. Since aspects $412_1$-$412_N$ were developed by aspect editor 404 for compatibility with module bus 418, aspects $412_1$-$412_N$ can be readily added to module bus 418 without writing additional code to adapt the aspects $412_1$-$412_N$ for use within the particular module 414. Instead, module bus 418 and its associated logic automatically establish and manage the necessary functional interdependencies between the aspects $412_1$-$412_N$ in accordance with the functionalities of the respective aspects $412_1$-$412_N$.

Pursuant to an example, module developer 426 can select a group of aspects 412 for the purpose of creating a customized motor control module to be used in a motion-related application. One of the selected aspects $412_1$-$412_N$ can comprise a speed control function that module developer 426 wishes to include as part of the module's overall functionality, while another of the aspects $412_1$-$412_N$ can comprise a soft start function. Rather than requiring module developer 426 to write new code to customize the speed control aspect and the soft start aspect such that the two aspects interact properly within the module (e.g., to ensure the soft start functionality overrides the speed control functions during a soft start sequence, etc.), module bus 418 can automatically link the two aspects, establishing the necessary interdependencies and managing the interactions between the aspects. This can include, for example, determining that the speed control function must be subservient to the soft start function and establishing the necessary programmatic interlocks to ensure proper coordination between the functions.

The automated linking of aspects performed by the module bus 414 is made possible in part by designing the aspects $412_1$-$412_N$ to be compatible with the module bus during the aspect development phase. Developing an aspect for compliance with the module bus architecture can include, for example, classifying the aspect according to aspect type and defining necessary interdependencies between the aspect type and other aspect types in a format understandable by the module bus. When module bus 418 is presented with a bus-compatible aspect, the module bus can determine the aspect's type, read the defined interdependencies, and manage the interactions between the aspect and other aspects connected to the bus based on the defined interdependencies and the respective aspect types. It is to be appreciated that this method of assuring conformance of an aspect with the module bus is only intended to be exemplary, and that any suitable standard for compliance can be employed.

Once all the desired aspects $412_1$-$412_N$ have been added to the module bus, the resulting customized module 414 can be deployed in a controller 420 and used to carry out the control functionality encapsulated in the module 414 by virtue of its included aspects $412_1$-$412_N$. Controller 420 can include any number of customized modules 424, which can execute autonomously or in conjunction with a control program 422 that executes on controller 420. As noted above, customized modules 424 can comprise a number of predefined inputs and outputs that facilitate data exchange between the modules 424 and control program 422, and this I/O can be defined based on the selection of aspects that comprise the module.

In one or more embodiments of the present disclosure, the aspect editor 404, function library 408, and module editor 436 can comprise a composite system for developing and storing module aspects locally and assembling these aspects into customized modules to specification. Alternatively, aspect editor 404, function library 408, and module editor 436 can be distributed among different entities and managed separately to allow bus-compliant aspects to be created by an aspect developer and distributed to one or more module developers or other end users. For example, module developer 426 can represent an original equipment manufacturer (OEM) wishing to design a module that can be provided to end users of the OEM's equipment and integrated with the end users' control system to facilitate control of the equipment. Aspect developer 402 can represent the maker of the end users' control system, and can employ aspect editor 404 to create one or more functions in the form of bus-compliant aspects that can be used by module developer 426 to compile the desired equipment module using the OEM's module editor 436. Aspect developer 402 (the control system manufacturer) can develop the aspects according to specifications provided by the module developer 426 (the OEM) for functionality needed to properly control the OEM's equipment. Alternatively, the aspect developer 402 can generate a set of commonly used aspects and store these aspects on function library 408 for open access, and module developer 426 can employ the module editor 436 to retrieve the needed aspects and assemble these aspects into an equipment control module using the module bus.

As can be appreciated, the development systems described above can simplify module creation by allowing bus-compliant aspects to be selected in an ad hoc manner and added to the module bus without the need to write new code adapting the aspects to the idiosyncrasies of a particular module. The module bus architecture can also allow aspects to be readily interchanged without otherwise affecting operation of the other module functions. These aspects can prove beneficial in situations wherein a customer requests that a particular sub-function of a module be modified to suit the needs of the customer's particular control system. Rather than extensively rewriting the module to modify the sub-function per the customer's request and to update the interdependencies between the modified sub-function and the other functions comprising the module, one or more embodiments of the present disclosure can allow the module developer to modify only the aspect representing the sub-function in accordance with the requested change, while the module bus automatically updates and manages the interactions between the modified aspect and other aspects of the module.

Figures 5A, 5B:
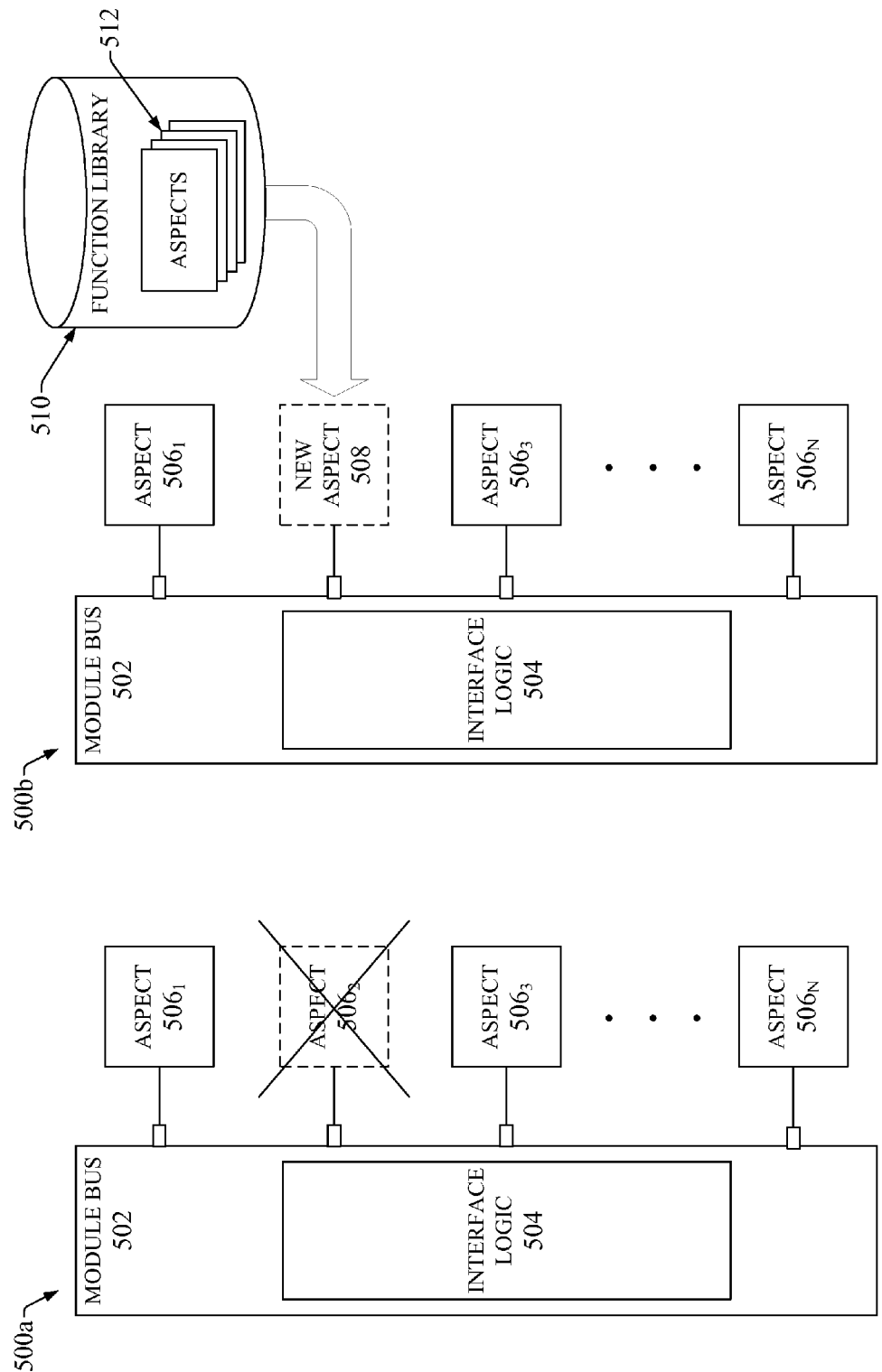
FIG. 5a illustrates removal of an aspect from a module bus.
FIG. 5b illustrates addition of a replacement aspect to a module bus.

Existing modules can also be modified as needed by replacing aspects on the module bus as needed without rewriting the module's code to update the replaced aspect's interfacing with the module. FIGS. 5a and 5b illustrate these modification techniques. Existing module 500a can comprise module bus 502 (and associated interface logic 504) and a number of aspects $506_1$-$506_N$. Module 500a can comprise, for example, an industry standard module encapsulating commonly used control functionality applicable in a number of different control applications, such as a level control module, a motion control module, a PID control module, or the like. In the present example, a customer requires that a sub-function of the module, encoded in aspect $506_2$, be modified or replaced so that the module 500a can properly interface with the customer's particular control system. Aspect $506_2$ can comprise a cross-cutting concern having at least one functional relationship or interdependency with at least one other aspect comprising the module.

To effect the desired modification, aspect $506_2$ is removed from module bus 502 as shown in FIG. 5a. In general, when an aspect is removed from module bus 502, module bus 502 and its included interface logic 504 automatically update the relationships and interdependencies of the remaining aspects accordingly without requiring those aspects (or their respective interfaces to the bus) to be modified by a developer. Thus, after removal of aspect $506_2$, module 500a as modified can conceivably be instantiated and employed in a control application without further modification by a developer. However, in the present example, the deleted aspect $506_2$ is replaced with a new aspect 508 to yield an altered, customized module 500b that better suits the requirements of the customer's particular control application, as illustrated in FIG. 5b. This new aspect 508 can be selected from a set of predefined bus-compliant aspects 512 maintained in function library 510 (similar to the function library 408 described above in connection with FIG. 4). Alternatively, new aspect 508 can simply comprise aspect $506_2$ reprogrammed in accordance with the customer's request. In either case, new aspect 508 can be added to module bus 502, and upon detecting the addition of new aspect 508, module bus 502 and its associated interface logic 504 automatically establishes any necessary programmatic relationships between new aspect 508 and the other aspects on the bus 502 without requiring a developer to write additional code to interface new aspect 508 with the module 500b. Thus, although new aspect 508 encapsulates a cross-cutting concern that affects other modules or functionality comprising the module 500b, module bus 502 intelligently and autonomously manages the functional interdependencies between aspect 508 and the other aspects, removing the burden on a developer to create new code to customize the interface between the new aspect 508 and the rest of the module. Once new aspect 508 has been added to module bus 502, the resulting customized module 500b can be implemented in the customer's control system to carry out the desired altered functionality.

By providing a means to easily modify or replace aspects of a module in this fashion, the module bus architecture of the present disclosure can allow a module developer to easily accommodate customer-specific variances between control systems without extensive module reprogramming. Cross-cutting concerns can be embodied in predefined aspects designed for compatibility with the module bus architecture, thereby allowing free exchange of these encapsulated cross-cutting concerns between different modules and control applications. Moreover, the module bus architecture of the present disclosure can provide a common module development platform that allows aspects developed by different developers or vendors to be combined as needed into a single module by an end user or module developer. Since the aspects are designed to be compliant with the module bus architecture, and are therefore capable of being integrated via the module bus without custom code, the end user or module developer does not require understanding of the aspects' core programming in order to assemble the various vendors' aspects into a customized composite module.

Figure 6:
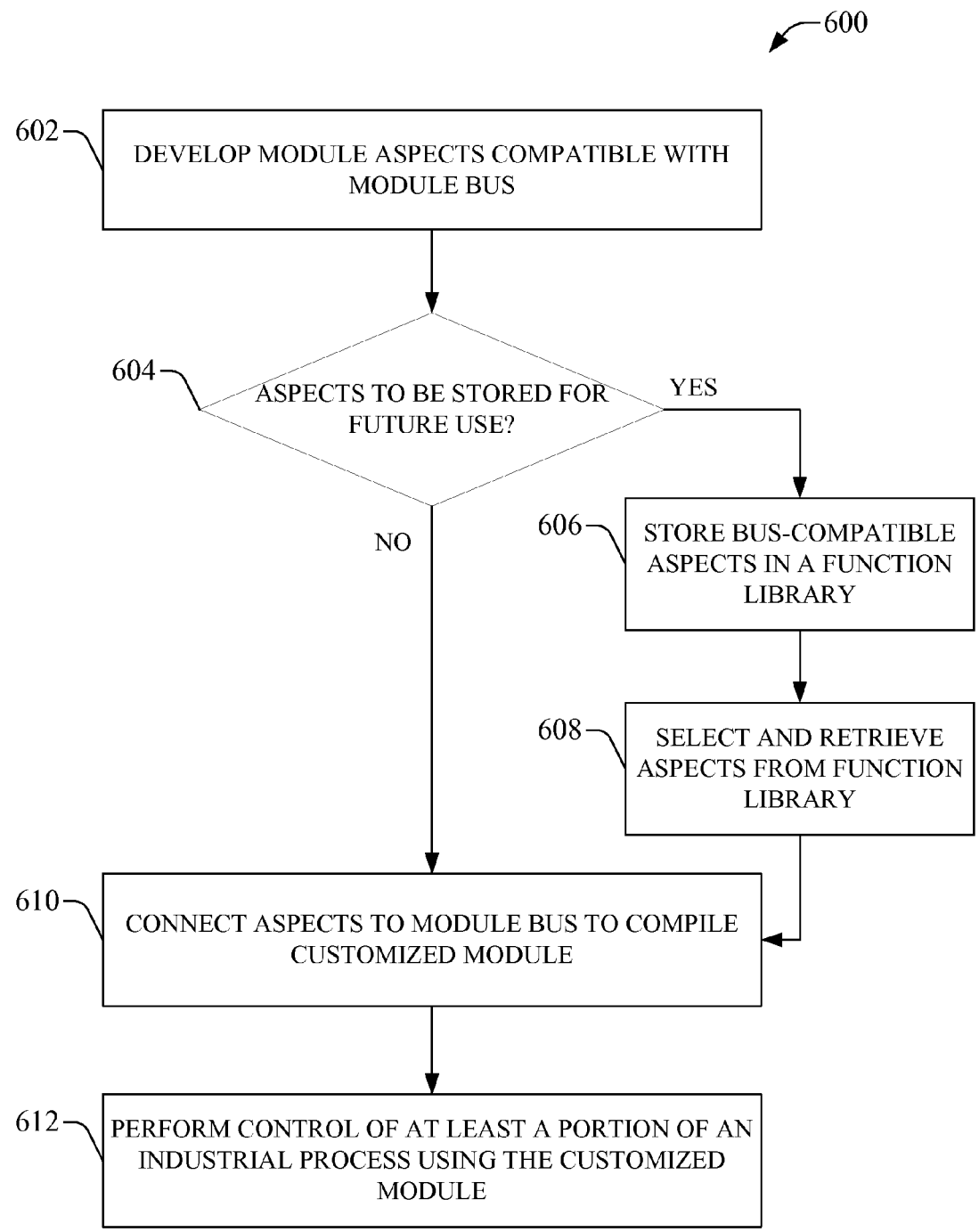
FIG. 6 is a flowchart of an example methodology for creating, storing, and utilizing aspects that can be assembled into a module using a module bus.
Figure 7:
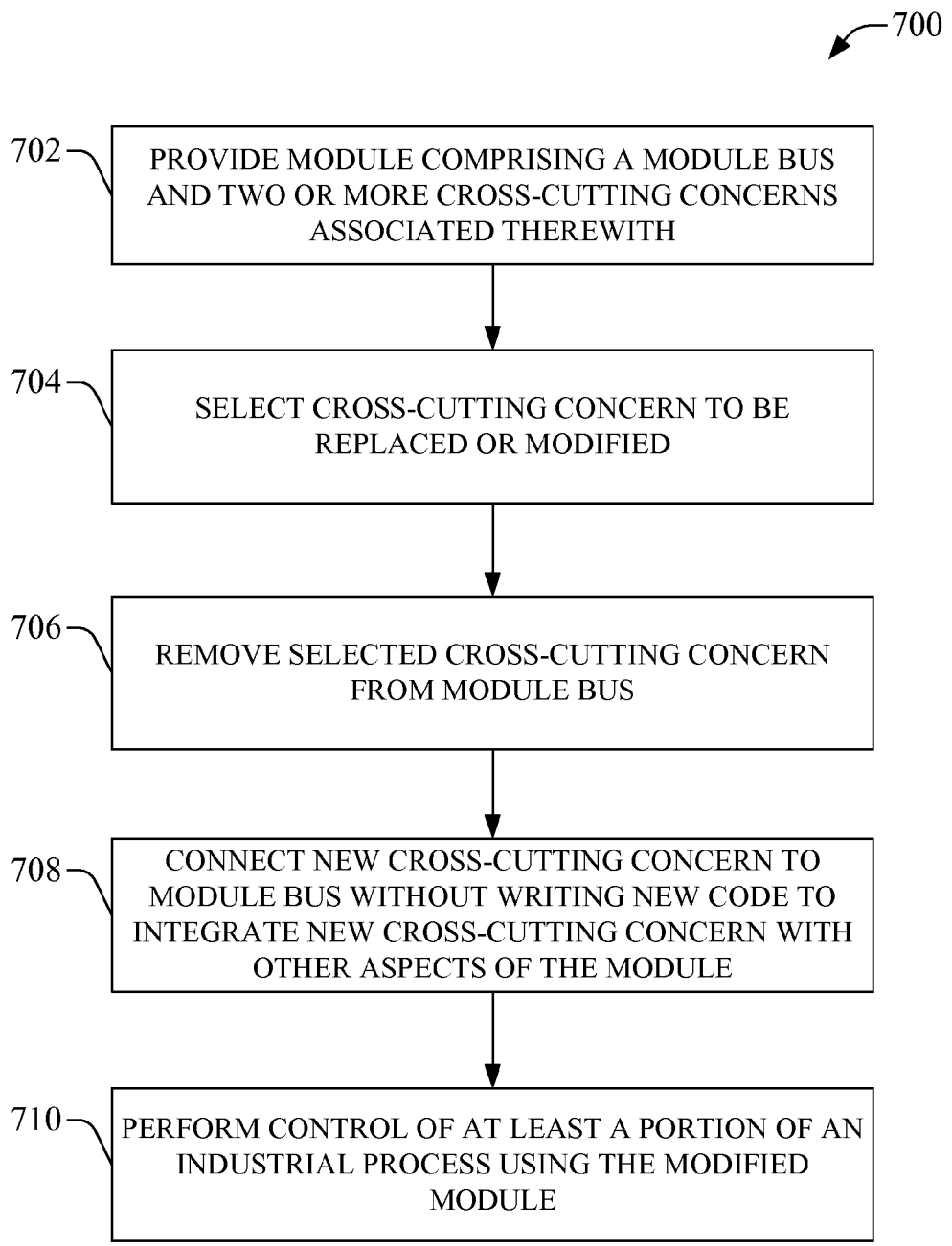
FIG. 7 is a flowchart of an example methodology for replacing or modifying sub-functions of a module created using a module bus architecture.
Figure 8:
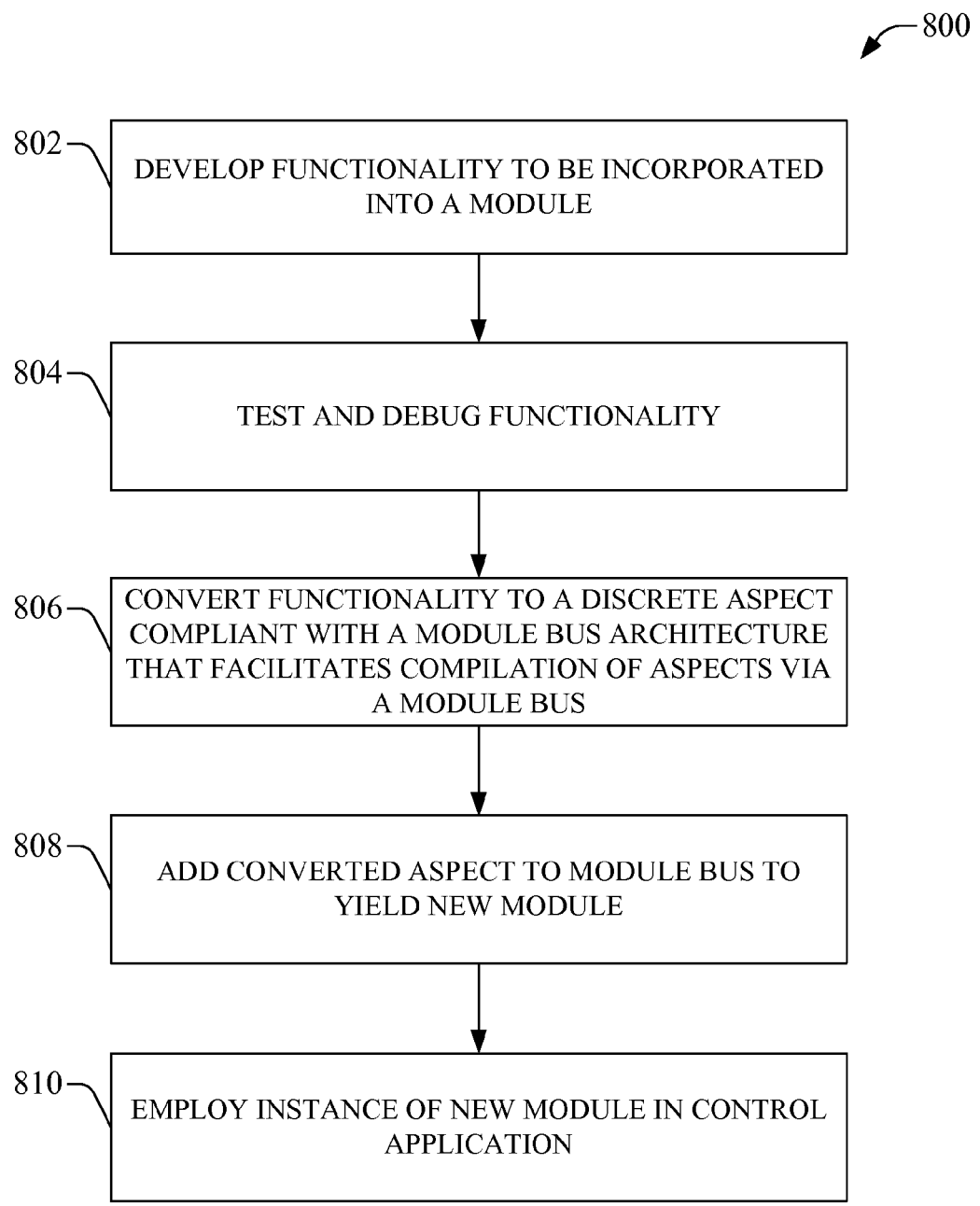
FIG. 8 is a flowchart of an example methodology for developing and converting module functionality into discrete aspects that are compatible with a module bus architecture.

FIGS. 6-8 illustrate various methodologies in accordance with the claimed subject matter. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 6 illustrates an example methodology 600 for creating, storing, and utilizing aspects that can be assembled into a module using a module bus. At 602, functional aspects are developed that are compatible with a module bus. The aspects represent encapsulated functionality or sub-functions that can be included in a module used to control at least a portion of an industrial monitoring and/or control process. The aspects can comprise cross-cutting concerns whose functionality, when integrated as part of a module, affect at least one other aspect of the module. The module bus acts as a virtual backplane to which functional aspects compatible with the bus can be added to form a module without writing new code to integrate the aspects.

At 604, a determination is made as to whether the aspects are to be stored for future use. If the developed aspects are not to be stored for future use, the aspects are connected to a module bus at 610 to create a customized module that meets functional specifications set forth by the module designer. Since the connected aspects were developed to be compatible with the module bus at step 602, the aspects can be added to or removed from the module bus without writing special code to link the aspects together or to coordinate their respective functionalities. Instead, the module bus detects the connected aspects, establishes the necessary interdependencies between the aspects, and manages the interactions between the aspects as the module executes to perform its designated functions.

If it is determined at 604 that the aspects are to be stored for future use, the aspects are stored in a function library for subsequent retrieval at 606. Function library can comprise any data storage means capable of storing the aspects in a manner that allows the aspects to be browsed or searched. In one or more embodiments, the developed aspects can be uploaded to a function library residing on a server and accessible via the Internet. Alternatively, the function library can reside locally at a facility for access by resident personnel only. At 608, aspects from the function library are selected and retrieved for inclusion in a customized module. Typically, a module designer will select an appropriate combination of aspects (functions) to fulfill a functional specification for a desired module. The desired module can comprise, for example, a motor control module, a PID control module, a sequencing module, a batch process module, or the like. Aspects can be selected by browsing the available aspects on the function library, by performing a keyword search to locate one or more aspects matching a desired sub-function, or by other appropriate locating techniques. The methodology then moves to 610, where the selected aspects are connected to the bus as described above. At 612, the resulting customized module is used to perform control of at least a portion of an industrial process in accordance with the composite functionality bestowed by the aspects. For example, the customized module can be deployed on one or more controllers (e.g., PACs) and executed thereon, either autonomously or as part of a control program executing on the controller, to perform control of the process.

FIG. 7 illustrates an example methodology 700 for replacing or modifying sub-functions of a module created using a module bus architecture. At 702, a module is provided comprising a module bus and two or more cross-cutting concerns associated therewith. The cross-cutting concerns can define functionality built into the module by virtue of their connection to the module bus. The cross-cutting concerns can be designed for compatibility with the module bus, which comprises logic for managing the interactions between the cross-cutting concerns as the module executes its designated control functionality. At 704, a cross-cutting concern associated with the module is selected to be replaced or modified. The need to replace or modify a cross-cutting concern can arise when, for example, an end user requires one or more sub-functions of a preexisting module to be customized in order to accommodate a unique need of the end user's control system.

At 706, the selected cross-cutting concern is removed from the module bus. Although the cross-cutting concern can comprise functionality having one or more interdependencies with other aspects of the module, the selected cross-cutting concern can be removed from the bus without requiring a developer to modify the module's source code to update or delete these interdependencies. Instead, the module bus detects the removal of the selected cross-cutting concern and updates the interactions between the remaining aspects of the module accordingly. At 708, a new cross-cutting concern is connected to the module bus. The new cross-cutting concern can comprise an entirely different aspect from that which was removed in step 706, or alternatively can comprise a modified version of the removed aspect. As with the removal of the cross-cutting concern in step 706, the module's source code does not need to be modified by a developer to accommodate the new cross-cutting concern, nor does the source code for the cross-cutting concern need to be modified to adapt the concern to the module. Since the new cross-cutting concern was designed to be compliant with the module bus architecture, the module bus can automatically create and manage any necessary interactions between the new cross-cutting concern and the existing aspects already connected to the module bus. At 710, the resulting modified module is used to perform control of at least a portion of an industrial process by, for example, instantiating and executing the modified module on a controller.

FIG. 8 illustrates an example methodology 800 for developing and converting module functionality into discrete aspects that are compatible with a module bus architecture. At 802, functionality to be incorporated into a module is developed. The functionality can be developed using any suitable programming language, including but not limited to ladder code, function chart, script, JAVA, C code, Visual Basic, or other suitable development language. At 804, the functionality is tested and debugged. After proper operation of the functionality has been confirmed, the functionality is converted to a discrete aspect at 806. This conversion encompasses rendering the aspect in a format compliant with a module bus architecture that facilitates compilation of multiple compliant aspects via a module bus. At 808, the aspect is added to a module bus to yield a new module. It is to be appreciated that multiple aspects can be added to the module bus as needed to yield a module having a desired set of functions. Because the functionality encapsulated in the aspect was converted to an architecture-compliant format in step 806, the converted aspect can be added to and removed from the bus without rewriting the module's code or that of other aspects on the bus in order to accommodate the addition or removal of the aspect. The module bus recognizes that the aspect is compatible with the bus and automatically manages the integration of the cross-cutting concerns encapsulated by the aspect with the other aspects connected to the module bus.

Figure 9:
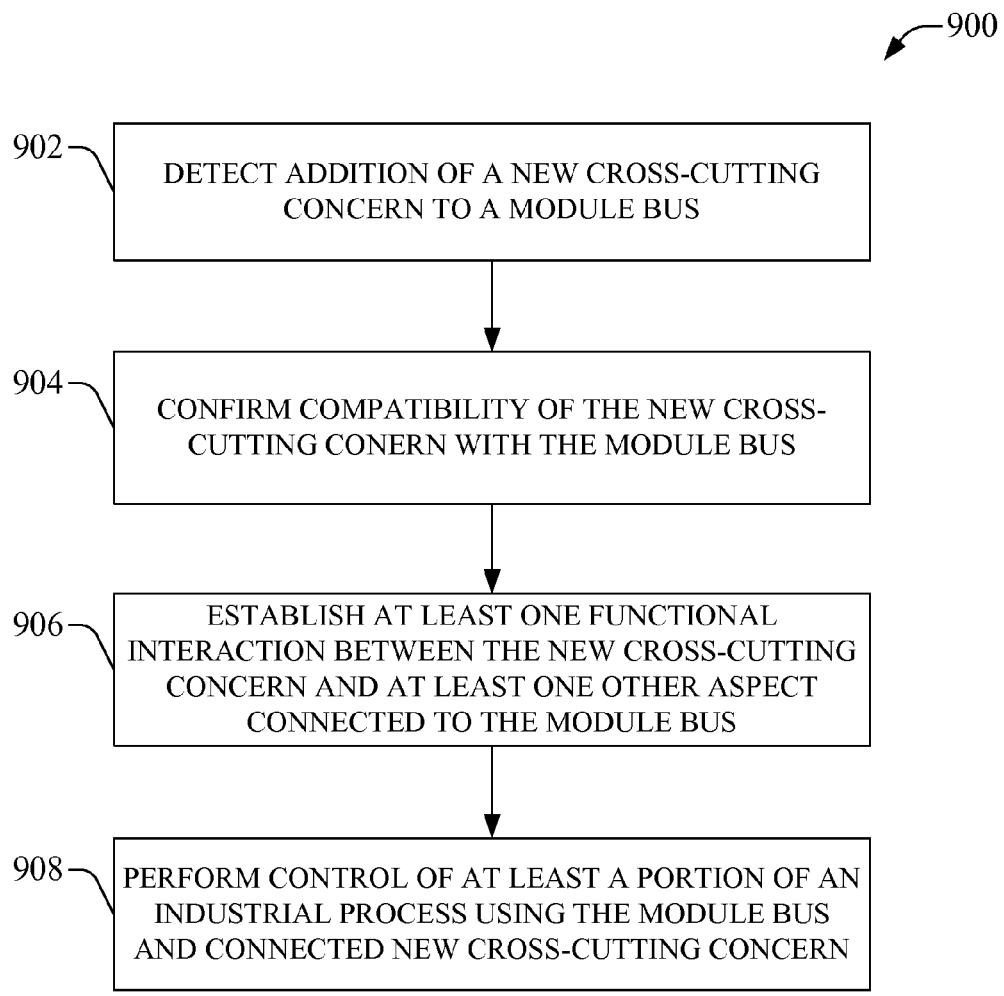
FIG. 9 is a flowchart of an example methodology for integrating cross-cutting concerns into a module.

FIG. 9 illustrates an example methodology carried out by a module bus for integrating cross-cutting concerns into a module without the need to write or modify module code interfacing the cross-cutting concerns with the module. At 902, a new cross-cutting concern is added to the module bus, and the addition is detected. At 904, compatibility of the new cross-cutting concern with the module bus is confirmed. At 906, at least one functional interaction between the new cross-cutting concern and at least one other aspect connected to the module bus is established. This interaction can be established by the module bus upon confirming compatibility of the new cross-cutting concern. For example, if the new cross-cutting concern is a logging function that facilitates recording of motor speed adjustments, the module bus can automatically establish any necessary programmatic relationships between the logging aspect and a motor speed control aspect also connected to the module bus, mitigating the need for a developer to write new module programming to tie the existing motor speed control function with the logging aspect. At 908, the module comprising the module bus and the connected cross-cutting concern is used to perform control of at least a portion of an industrial process.

Embodiments, systems and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

Figure 10:
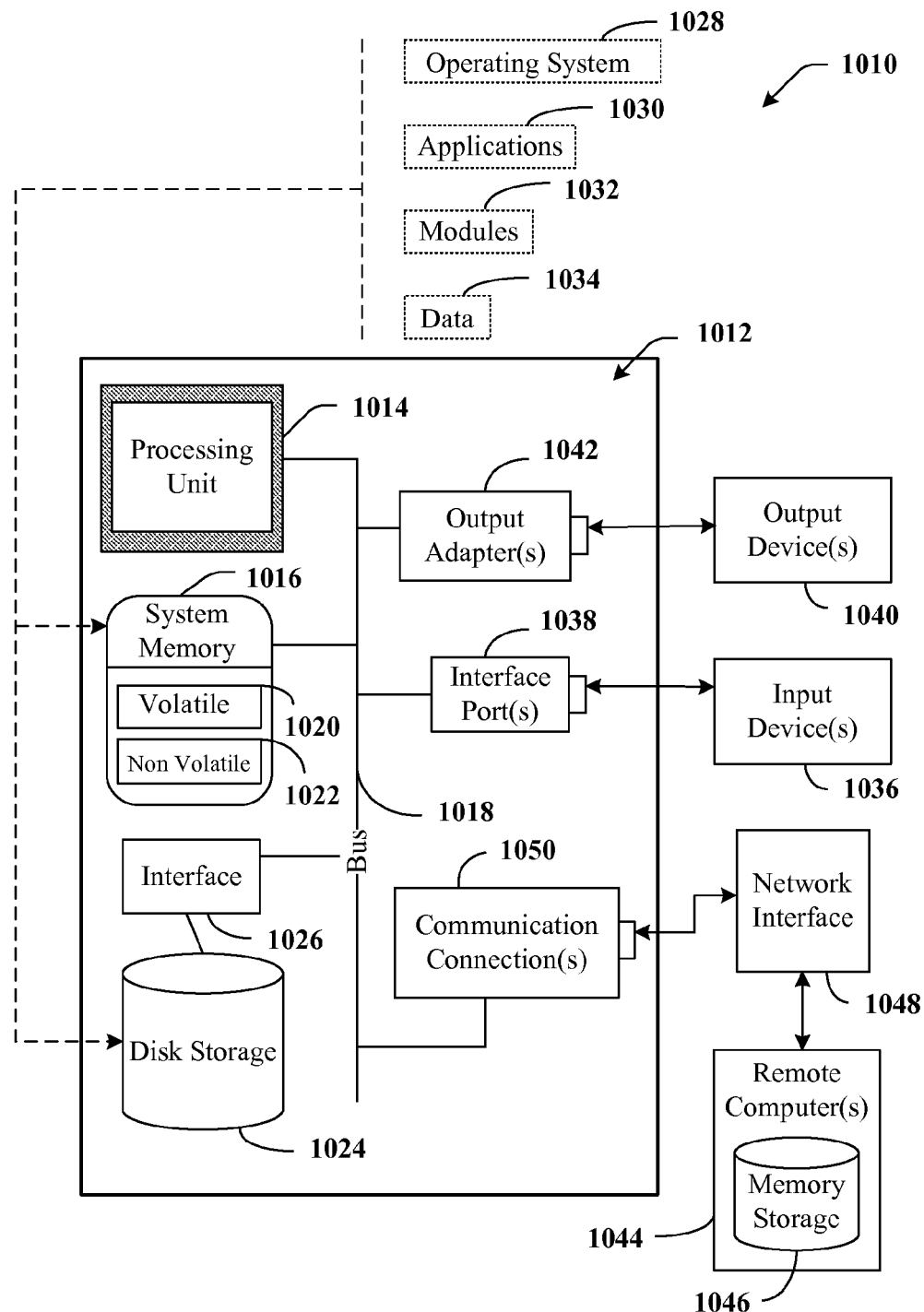
FIG. 10 is an example computing environment.

With reference to FIG. 10, an example environment 1010 for implementing various aspects of the aforementioned subject matter, including retaining documentation natively within memory of an industrial controller, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
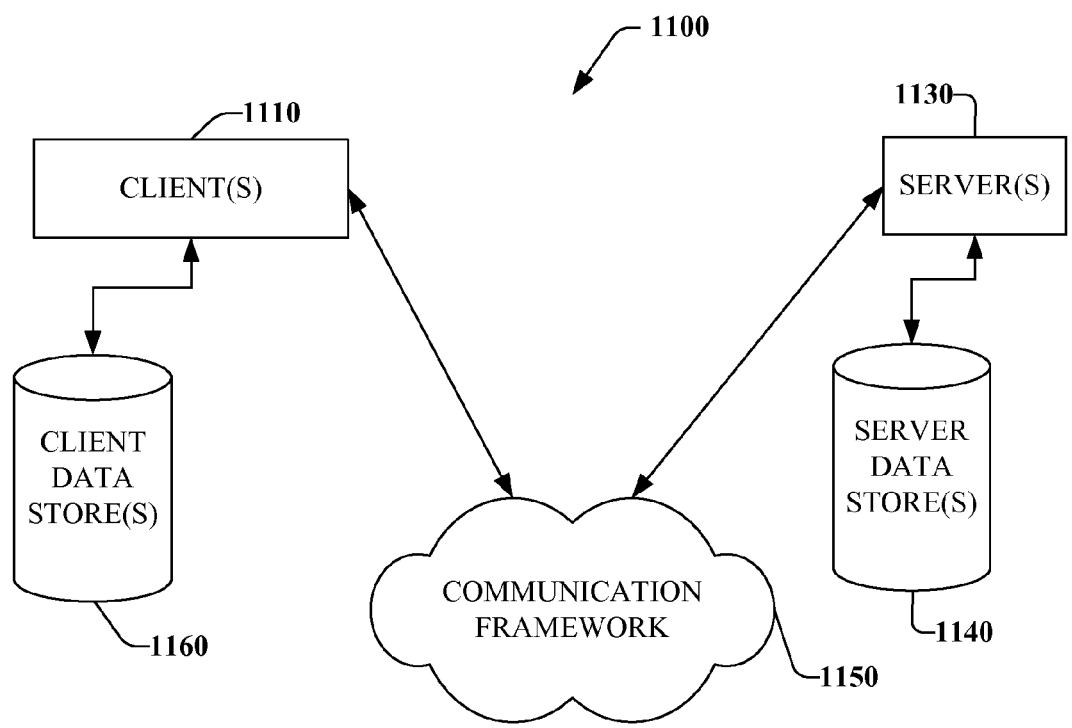
FIG. 11 is an example networking environment.

FIG. 11 is a schematic block diagram of a sample-computing environment 1100 with which the disclosed subject matter can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for creating modules for use in industrial control, comprising:
   receiving, via a programming interface of an aspect editor, programming input that defines a unit of control functionality;
   converting, by a conversion component of the aspect editor, the programming input to a format that is compatible with a module bus to yield a cross-cutting concern;
   verifying, by a testing tool of the aspect editor, operation of the cross-cutting concern to yield a first verified cross-cutting concern, wherein the verifying comprises confirming one or more outputs of the cross-cutting concern in response to one or more simulated inputs provided to the cross-cutting concern; and
   storing the verified cross-cutting concern in a function library comprising multiple verified cross-cutting concerns;
   wherein integration of the first verified cross-cutting concern with the module bus in a development environment causes the module bus to create one or more programmatic interdependencies between the first verified cross-cutting concern and a second verified cross cutting concern, of the multiple verified cross-cutting concerns, integrated with the module bus to yield a module, the one or more programmatic interdependencies enforcing a subservience of a first control function corresponding to the first verified cross-cutting concern to a second control function corresponding to the second verified cross-cutting concern, and
   wherein the module comprises the first verified cross-cutting concern, the second verified cross-cutting concern, and the module bus.

2. The method of claim 1, wherein the function library is a component of the development environment.

3. The method of claim 2, further comprising:
   filtering the multiple verified cross-cutting concerns based on search criterion data to yield a filtered set of verified cross-cutting concerns; and
   retrieving at least one of the filtered set of cross-cutting concerns from the function library.

4. The method of claim 2, further comprising organizing the multiple verified cross-cutting concerns in the function library in a hierarchical structure that classifies the multiple verified cross-cutting concerns according to at least one of an industry, a control type, or a functionality.

5. The method of claim 1, further comprising creating the module in response to confirming that the first verified cross-cutting concern and the second verified cross-cutting concern are compatible with the module bus.

6. The method of claim 1, further comprising executing the module in one or more controllers to facilitate at least one of monitor or control of at least a portion of an industrial process.

7. The method of claim 1, further comprising deploying the module in a control program executed by the industrial controller, wherein the module is further configured to control operation of at least one of an industrial process or an industrial device based on functionality defined by the first verified cross-cutting concern and the second verified cross-cutting concern.

8. The method of claim 4, further comprising:
   receiving selection input that selects a classification associated with the hierarchical structure; and
   rendering a subset of the multiple verified cross-cutting concerns corresponding to the classification.

9. A system that facilitates development of modules for control of at least a portion of an industrial process, comprising:
   a processor, coupled to a memory, that executes or facilitates execution of computer executable components, comprising:
   a programming interface configured to receive programming input defining a unit of control functionality;
   a conversion component configured to convert the programming input to a format that is compatible with a module bus to yield a cross-cutting concern;
   a testing component configured to verify operation of the cross-cutting concern based on one or more outputs generated by the cross-cutting concern in response to one or more simulated inputs provided to the cross-cutting concern to yield a first verified cross-cutting concern;
   a function library configured to store a plurality of verified cross-cutting concerns including the first verified cross-cutting concern;
   wherein the first verified cross-cutting concern is configured to, in response to integration with the module bus in a module development environment, create one or more programmatic interdependencies with a second verified cross-cutting concern of the verified cross-cutting concerns to yield a module comprising the first verified cross-cutting concern, the second verified cross-cutting concern, and the module bus,
   the at least one programmatic interdependency enforces a subservience of a first control function corresponding to the first verified cross-cutting concern to a second control function corresponding to the second verified cross-cutting concern, and
   the module is configured to be deployed and executed in an industrial controller.

10. The system of claim 9, further comprising a retrieval component configured to at least one of browse or search the function library and to retrieve at least one of the first verified cross-cutting concern or the second verified cross-cutting concern from the function library.

11. The system of claim 10, wherein the function library is configured to store the plurality of verified cross-cutting concerns in a hierarchical structure that categorizes the plurality verified of cross-cutting concerns according to at least one of an industry, a type of control, or a functionality.

12. The system of claim 9, wherein the first verified cross-cutting concern is further configured to, in response to detection of an addition of the second cross-cutting concern to the module bus or a removal of the second cross-cutting concern from the module bus, update one or more programmatic interdependencies with remaining verified cross-cutting concerns integrated with the module bus based on the addition or the removal.

13. The system of claim 9, wherein the programming input defines one or more module specifications.

14. The system of claim 9, wherein the module comprises at least one input and at least one output that are defined based on the first verified cross-cutting concern and the second verified cross-cutting concern integrated with the module bus.

15. The system of claim 11, further comprising a retrieval component configured to receive search criterion data that facilitates browsing of the hierarchical structure to locate one or more of the plurality of verified cross-cutting concerns.

16. A non-transitory computer-readable medium having stored thereon computer-executable components that, in response to execution, cause a device to perform operations, comprising:
  creating a unit of control functionality based on programming input that specifies the control functionality;
  converting the unit of control functionality to a format that is compatible with a module bus to yield a cross-cutting concern;
  confirming operation of the cross-cutting concern based on confirmation of one or more outputs generated by the cross-cutting concern in response to one or more simulated inputs to the cross-cutting concern to yield a first verified cross-cutting concern;
  storing the first verified cross-cutting concern in a function library comprising a plurality of verified cross-cutting concerns;
  detecting selection of the first verified cress-cutting concern from the function library for integration with a module bus in a development environment;
  creating at least one cross-cutting interdependency between the first verified cross-cutting concern and a second verified cross-cutting concern integrated with the module bus in response to the detecting, the at least one cross-cutting interdependency enforcing a subservience of a first control function corresponding to the first verified cross-cutting concern to a second control function corresponding to the second verified cross-cutting concern; and
  generating a module comprising the first verified cross-cutting concern, the second verified cross-cutting concern, and the module bus based on the at least one cross-cutting interdependency, wherein the module is configured to be deployed and executed on an industrial controller.

17. The system of claim 9, wherein the module is further configured to receive input data from a control program executed by the industrial controller and provide output data to the control program, wherein the output data is based on the input data and functionality defined by the first verified cross-cutting concern and the second verified cross-cutting concern.

18. The non-transitory computer-readable storage medium of claim 16, wherein the generating the module comprises defining at least one input and at least one output for the module based on the first verified cross-cutting concern and the second verified cross-cutting concern, and wherein the at least one input and the at least one output are configured to exchange data with a control program that executes on the industrial controller.

19. The non-transitory computer-readable medium of claim 16, wherein the storing comprises storing the first verified cross-cutting concern in the function library in accordance with a hierarchical structure that classifies the plurality of verified cross-cutting concerns according to at least one of an industry, a control type, or a functionality.

* * * * *